US008887515B2

(12) United States Patent
Patstone

(10) Patent No.: US 8,887,515 B2
(45) Date of Patent: Nov. 18, 2014

(54) THERMAL MANAGEMENT SYSTEMS AND METHODS

(75) Inventor: Christopher H. Patstone, Northampton, MA (US)

(73) Assignee: Pelican BioPharma, LLC, Torrance, CA (US)

( * ) Notice: Subject to any disclaimer, the term of this patent is extended or adjusted under 35 U.S.C. 154(b) by 181 days.

(21) Appl. No.: 13/593,432

(22) Filed: Aug. 23, 2012

(65) Prior Publication Data
US 2014/0054297 A1    Feb. 27, 2014

(51) Int. Cl.
F25D 3/12    (2006.01)
(52) U.S. Cl.
USPC .................. 62/56; 62/457.2; 62/530
(58) Field of Classification Search
CPC ............ F25D 3/08; F25D 2303/0845; F25D 2303/0843; F25D 2303/0844
USPC .......... 62/257.2, 371, 530, 457.2, 259.1; 220/592.01, 592.02
See application file for complete search history.

(56) References Cited

U.S. PATENT DOCUMENTS

| 6,686,003 | B2 * | 2/2004 | Legare ...................... 428/34.4 |
| 6,761,041 | B2 * | 7/2004 | Roth et al. ................. 62/457.2 |
| 7,500,593 | B2 * | 3/2009 | Mayer ....................... 229/103.11 |
| 7,908,870 | B2 * | 3/2011 | Williams et al. ............ 62/62 |
| 8,424,335 | B2 * | 4/2013 | Corder et al. ............... 62/371 |
| 2002/0088244 | A1 * | 7/2002 | Jennings et al. ............. 62/371 |
| 2004/0151851 | A1 * | 8/2004 | Miller ........................ 428/34.2 |
| 2004/0231355 | A1 | 11/2004 | Mayer |
| 2007/0186577 | A1 | 8/2007 | Goncharko |
| 2008/0276643 | A1 * | 11/2008 | Heroux et al. .............. 62/457.2 |

FOREIGN PATENT DOCUMENTS

| EP | 1 746 238 | 1/2007 |
| JP | 2011-051632 A | 3/2011 |
| WO | WO-2012/094333 | 7/2012 |

OTHER PUBLICATIONS

Australian Examiner's Report issued Aug. 1, 2013, from related Australian Patent Application No. 2012227268.
Japanese Office Action from related Japanese Patent Application No. 2012-228721, received Dec. 16, 2013, 4 pages.

* cited by examiner

*Primary Examiner* — Mohammad M Ali
(74) *Attorney, Agent, or Firm* — Foley & Lardner LLP

(57) ABSTRACT

A thermal management system includes a case; an insulation material provided within the case, the insulation material defining an interior volume of the insulation material; a liner arranged in the interior volume, the liner having an inner surface that extends toward a center of the case; an outer container of phase change material provided in the liner, the outer container comprising a plurality of outer panels containing a first phase change material, the plurality of outer panels comprising a bottom outer panel, a top outer panel, and side outer panels; and an inner container of phase change material provided in the outer container, the inner container comprising a plurality of inner panels containing a second phase change material; wherein an outer surface of each of the side outer panels is parallel with the inner surface of the liner.

20 Claims, 10 Drawing Sheets

THERMAL MANAGEMENT SYSTEMS AND METHODS

TECHNICAL FIELD

The disclosure relates generally to the field of thermal management systems and methods, and, in particular, to phase change material systems and methods.

BACKGROUND

Passive shippers typically use a phase change material (PCM) that changes from solid to liquid and vice versa (e.g., ice to water and water to ice), where the PCM's temperature changes minimally while the PCM absorbs or releases energy due to external/internal temperature differential. This is how ice is able to maintain a beverage cold, by absorbing heat from the beverage (which itself is absorbing heat from the environment or the user's hand) while the ice turns into a liquid (at zero degrees Celsius/thirty-two degrees Fahrenheit). This is also how commonly available water-based gel packs or packets are able to maintain temperatures near zero degrees Celsius inside of an insulated lunch box or camping cooler.

The term "passive" is used in "passive shippers" because these types of systems are only able to maintain one temperature (the phase change temperature, such as for example zero degrees Celsius) and only in one direction per phase change condition. In this way, a frozen block of ice can only maintain zero degrees Celsius and protect against a temperature differential that is above the phase change temperature of the material (zero degrees Celsius or above). For example, a frozen block of ice cannot maintain zero degrees Celsius when exposed to a temperature below zero degrees (e.g., negative twenty degrees Celsius). Using frozen ice to protect a product that cannot be exposed to, for example, negative twenty degrees Celsius may not be ideal because no phase change will occur in the ice from zero degrees Celsius to negative twenty degrees Celsius.

However, the same frozen block of ice can protect a product that must be at zero degrees Celsius against warm temperatures, for a time period, because melting occurs at zero degrees Celsius, and the temperature of zero degrees is maintained during the time period while the ice melts.

Typical "passive" systems are not able to adjust to outside temperatures in order to maintain the appropriate temperature range. For example, consider a product that needs to be maintained between negative ten degrees Celsius and ten degrees Celsius. If only frozen ice were used in a passive shipping system, then only protection over ten degrees Celsius could be provided, and for a certain amount of time (the time for the ice to melt). Thus, frozen ice may be effective in the summer, where an ambient temperature of thirty degrees Celsius would otherwise warm the product. However, the frozen ice would not protect against a negative ten-degree temperature.

An option to overcome this problem could be to combine frozen ice with liquid water in the same shipping container. Because both liquid water and frozen ice will equilibrate at zero degrees Celsius (thus no temperature differential, therefore no heat transfer and no change in temperature, for the time period while melting or freezing occurs) zero degrees Celsius can be maintained for a certain period of time in both winter and summer environmental conditions. This can be a very cost effective and efficient way of accurately maintaining zero degrees Celsius inside of a shipper. However, the fact that a frozen and refrigerated water shipper is excellent for zero degrees Celsius means that it may not be suitable for a range of two to eight degrees Celsius since this range is above or outside zero degrees Celsius.

Various types of passive shippers for shipping refrigerated products use PCMs, including water-based PCM gel packs or packets and custom PCM packs.

Water-based PCM gel packs or packets: An insulated shipper with a passive water-based PCM may be used to maintain a constant temperature inside of a payload chamber. The advantages of water-based PCM gel packs or packets are low cost, low toxicity, and minimal environmental impact (disposability). Water-based PCM gel packs can be easily gelled to prevent leakage in the event of a puncture and can make the gel pack more rigid. These gel packs are usually tested against standard temperature profiles that simulate, for example, twenty-four, forty-eight, seventy-two, or ninety-six hours environmental conditions for worst-case winter and summer conditions.

However, with this type of shipper, water changes phase at zero degrees Celsius (thirty-two degrees Fahrenheit), which may be too low for pharmaceutical products or other products and can lead to freezing of the product. Accordingly, a buffer component can be added between the zero-degrees Celsius frozen water-based gel pack and the product (which requires a temperature of, for example, two to eight degrees Celsius). Such buffer components can include, for example, refrigerated water-based gel packs, bubble wrap, an air gap to avoid freezing the product.

Custom PCM Packs: An insulated passive shipper with a passive custom PCM may be used to maintain a constant temperature inside of the payload chamber. A custom PCM is a chemical, other than plain water, which is chosen for its freeze and melt point to maintain a temperature other than zero degrees Celsius, the freeze and melt temperature of water. Custom PCM packs are advantageous in that they are less expensive than active shippers (e.g., compressor-driven systems, Peltier-based devices, heater/cooler devices, etc.). Custom PCM packs usually have a much lower (half or less) heat of fusion (amount of energy required to melt or freeze a quantity of mass of material, or how long the material will maintain a certain temperature or 'last') when compared to water. This means that there is much less energy involved in the freezing and melting process, and therefore it can take more mass of custom PCM (as compared to waster-based PCM), which in turn means that the overall scale of the shipper may be larger and heavier. Custom PCM packs typically control temperature for a shorter period than water-based PCM packs.

SUMMARY OF THE DISCLOSURE

A thermal management system may include any one or more of a case, an insulation material, a liner, an outer container of phase change material, and an inner container of phase change material. The insulation material is provided within the case. The insulation material defines an interior volume of the insulation material. The liner is arranged in the interior volume of the liner. The liner has an inner surface that extends at an angle inward toward a center of the liner. The outer container of phase change material is provided in the liner. The outer container comprises a plurality of outer panels containing a first phase change material. The plurality of outer panels comprises a bottom outer panel, a top outer panel, and side outer panels. The inner container of phase change material is provided in the outer container. The inner container comprises a plurality of inner panels containing a second phase change material. An outer surface of each of the side outer panels is parallel with the inner surface of the liner.

In various embodiments, for each of the side outer panels, a thickness between the outer surface of the side outer panel and an inner surface of the side outer panel at a bottom end of the side outer panel is less than a thickness between the outer surface and the inner surface at a top end of the side outer panel.

In various embodiments, for each of the side outer panels, a thickness between the outer surface of the side outer panel and an inner surface of the side outer panel increases from a bottom end of the side outer panel to a top end of the side outer panel.

In various embodiments, for each of the side outer panels, an inner surface of the side outer panel is perpendicular to the bottom outer panel, and the outer surface of the side outer panel is not perpendicular to the bottom outer panel.

In various embodiments, for each of the side outer panels, an inner surface of the side outer panel is not parallel with the inner surface of the liner.

In various embodiments, the plurality of inner panels comprises a bottom inner panel, a top inner panel, and side inner panels. An outer surface of each of the side inner panels is parallel with the inner surface of the liner.

In some embodiments, for each of the side inner panels, a thickness between the outer surface of the side inner panel and an inner surface of the side inner panel at a bottom end of the side inner panel is less than a thickness between the outer surface and the inner surface at a top end of the side inner panel.

In some embodiments, for each of the side inner panels, a thickness between the outer surface of the side inner panel and an inner surface of the side inner panel increases from a bottom end of the side inner panel to a top end of the side inner panel.

In some embodiments, for each of the side inner panels, an inner surface of the side inner panel is perpendicular to the bottom outer panel, and the outer surface of the side inner panel is not perpendicular to the bottom outer panel.

In some embodiments, for each of the side inner panels, an inner surface of the side inner panel is not parallel with the inner surface of the liner.

In various embodiments, the first phase change material is the second phase change material.

In various embodiments, the first phase change material is a different phase change material from the second phase change material.

A method of manufacturing a thermal management system includes (but is not limited to) any one or combination of: (i) providing a case; (ii) providing an insulation material within the case, the insulation material defining an interior volume of the insulation material; (iii) arranging a liner in the interior volume of the liner, the liner having an inner surface that extends at an angle inward toward a center of the liner; (iv) providing an outer container of phase change material in the liner, the outer container comprising a plurality of outer panels containing a first phase change material, the plurality of outer panels comprising a bottom outer panel, a top outer panel, and side outer panels; and (v) providing an inner container of phase change material in the outer container, the inner container comprising a plurality of inner panels containing a second phase change material; wherein an outer surface of each of the side outer panels is parallel with the inner surface of the liner.

A thermal management system may include one or more of a case; an insulation material; a liner; an outer container of phase change material; and an inner container of phase change material. The insulation material may be provided within the case. The insulation material defines an interior volume. The liner is arranged in the interior volume of the insulation material, the liner defining an interior volume. The outer container of phase change material is provided in the interior volume of the liner. The outer container defines an interior volume. The outer container comprising a plurality of outer panels containing a first phase change material. The plurality of outer panels comprises a bottom outer panel, a top outer panel, and side outer panels. The inner container of phase change material is provided in the interior volume of the outer container. The inner container defines an interior volume in which a payload is to be received. The inner container comprising a plurality of inner panels containing a second phase change material. The plurality of inner panels comprises a bottom inner panel, a top inner panel, and side inner panels. A first non-linear path is formed between the interior volume of the liner and the interior volume of the outer container where one or more of the outer panels meet at least one other of the outer panels. A second non-linear path is formed between the interior volume of the outer container and the interior volume of the inner container where one or more of the inner panels meet at least one other of the inner panels.

In various embodiments, the bottom outer panel has at least one recess for receiving a portion of one or more of the side outer panels. Each recess and the portion of one or more of the side outer panels defines at least a portion of the first non-linear path.

In some embodiments, the bottom inner panel has at least one recess for receiving a portion of one or more of the side inner panels. Each recess of the bottom inner panel and the portion of one or more of the side inner panels defines at least a portion of the second non-linear path.

In various embodiments, the bottom outer panel is configured to interlock with the side outer panels along the first non-linear path.

In some embodiments, the bottom inner panel is configured to interlock with the side inner panels along the second non-linear path.

In some embodiments, at least one of the inner panels includes a raised portion provided on an inner surface of the at least one of the inner panel. A surface of the raised portion defines a portion of the second non-linear path.

A method of manufacturing a thermal management system includes (but is not limited to any one or combination of): (i) providing a case; (ii) providing an insulation material within the case, the insulation material defining an interior volume; (iii) arranging a liner in the interior volume of the insulation material, the liner defining an interior volume; (iv) providing an outer container of phase change material in the interior volume of the liner, the outer container defining an interior volume; the outer container comprising a plurality of outer panels containing a first phase change material, the plurality of outer panels comprising a bottom outer panel, a top outer panel, and side outer panels; and (iv) providing an inner container of phase change material in the interior volume of the outer container, the inner container defining an interior volume in which a payload is to be received, the inner container comprising a plurality of inner panels containing a second phase change material, the plurality of inner panels comprising a bottom inner panel, a top inner panel, and side inner panels; wherein a first non-linear path is formed between the interior volume of the liner and the interior volume of the outer container where one or more of the outer panels meet at least one other of the outer panels; and wherein a second non-linear path is formed between the interior volume of the outer container and the interior volume of the inner container where one or more of the inner panels meet at least one other of the inner panels.

DETAILED DESCRIPTION

Figure 1:
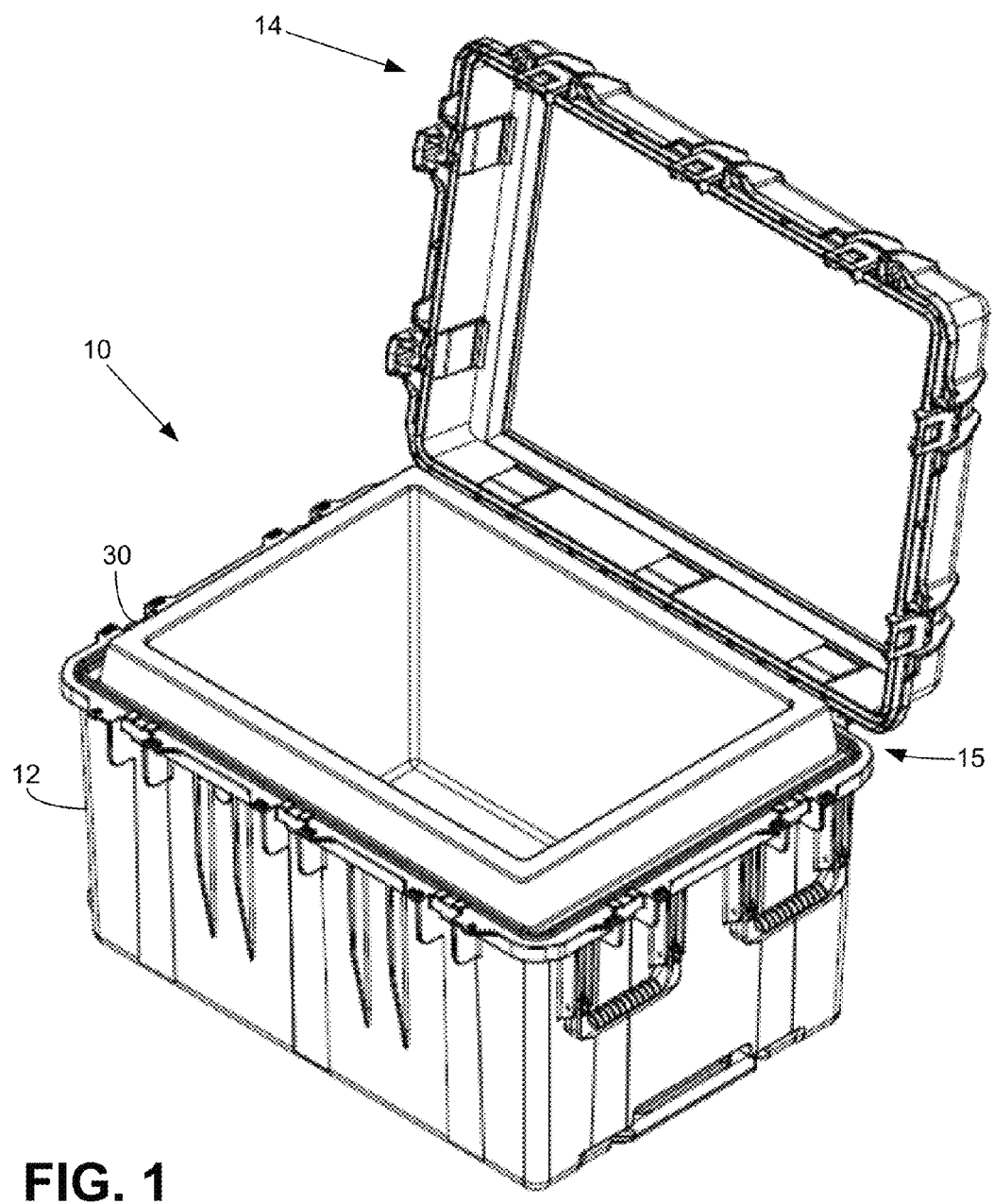
FIG. 1 is perspective view of a thermal management case according to various embodiments of the disclosure.

FIG. 1 illustrates a thermal management case 10 according to various embodiments. The case 10 may be made of any suitably rigid material (e.g., plastic, metal, composite materials, resins, etc.). The case 10 includes a base 12 for receiving one or more articles and a lid 14. In some embodiments, the lid 14 may be operatively connected to the base 12 (e.g., via a hinge member, latches, clip members, or the like).

Figure 2:
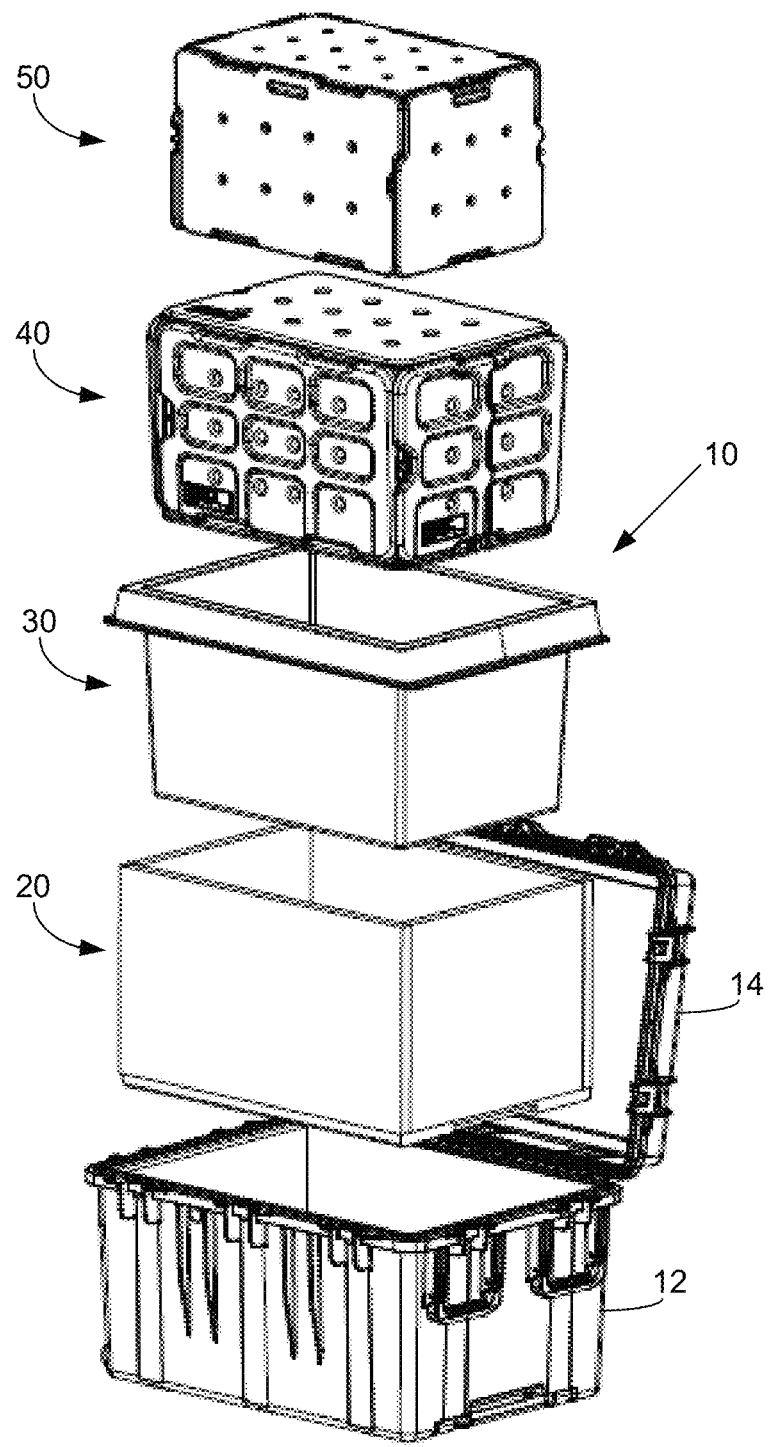
FIG. 2 is an exploded view of the thermal management case of FIG. 1.

FIG. 2 illustrates an exploded view of the case 10. An insulation material, such as VIP subassembly 20, may be arranged within the base 12. A liner 30 may be provided in the VIP-subassembly 20. One or more layers of panels of phase change material (PCM) may be provided in the liner 30. In particular embodiments, an outer container 40 of panels of PCM may be provided in the liner 30. An inner container 40 of panels of PCM may be provided in the inner container 30.

Figure 3A:
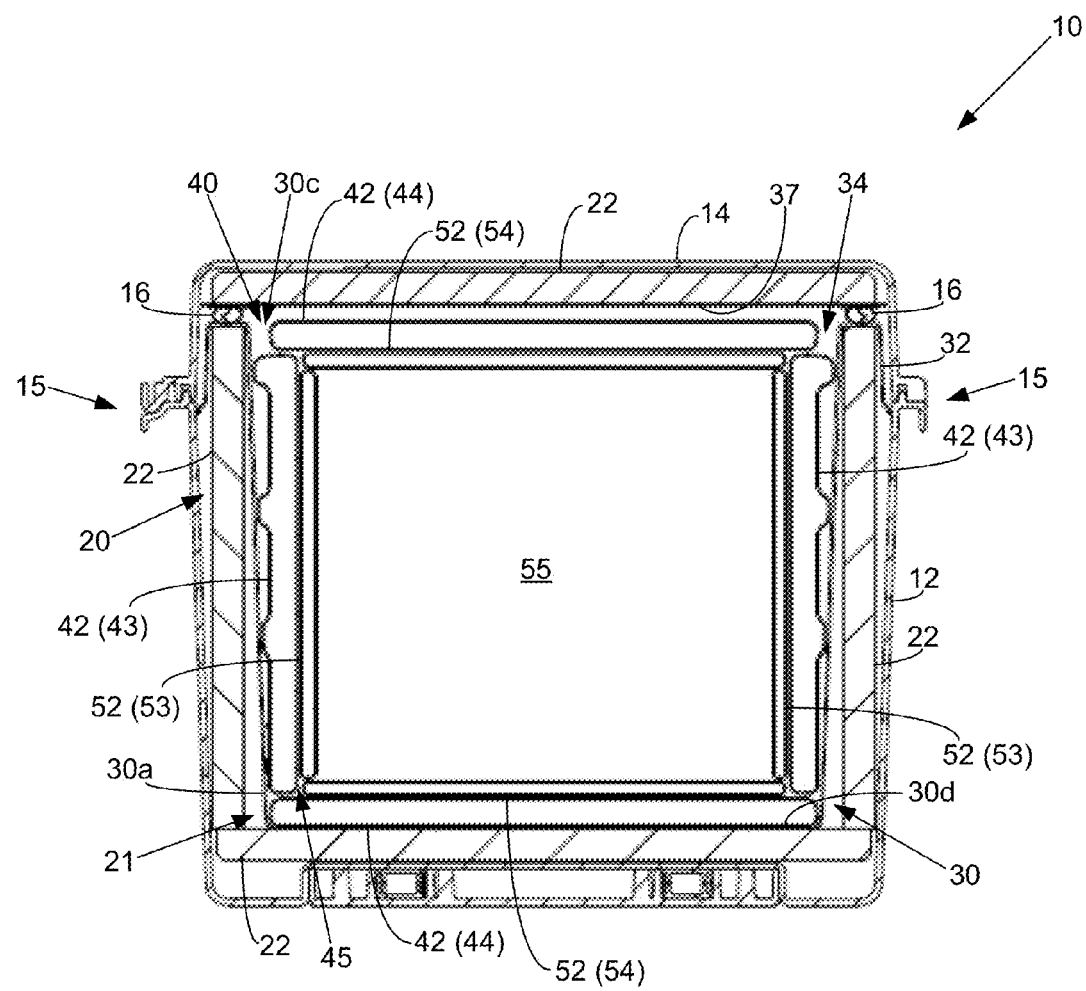
FIG. 3A is a cross-section view of the thermal management case of FIG. 1.
Figure 3B:
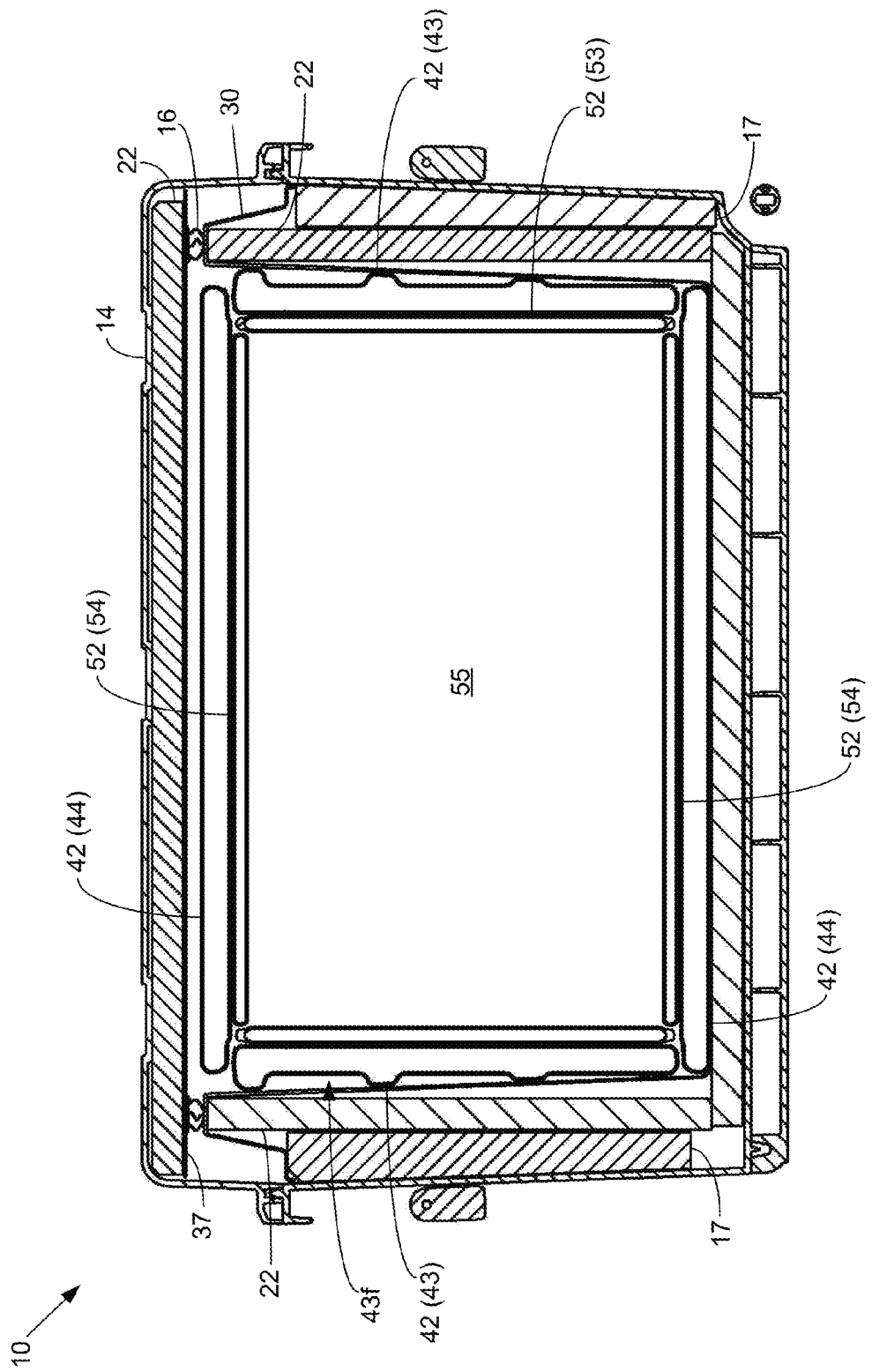
FIG. 3B is a cross-section view of the thermal management case of FIG. 1.

FIGS. 3A and 3B illustrate cross-section views of the case 10. With reference to FIGS. 1-3B, in various embodiments, one or more vacuum-insulated panels (VIPs) 22 may be arranged within the base 12. The VIPs 22 form five sides of the VIP subassembly 20 (e.g., a box-like structure or the like) in the base 12 of the case 10. A sixth VIP 22 is attached to the lid 14 to form a sixth (upper) side of the insulation subassembly 20 when the lid 14 is closed on the base 12 of the case 10. In other embodiments, any number of VIPs 22 may be used to form any suitable number of sides of the insulation subassembly 20. In particular embodiments, the VIP subassembly 20 in the base 12 is pre-assembled to ensure proper arrangement of the VIPs 22 to maximize thermal performance. In particular embodiments, the VIP subassembly 20 is fitted to the base 12 to become one structurally coherent assembly, to maximize durability and survivability in rough handling tests. In some embodiments, other insulation materials (e.g., fiber-based materials, foams, Styrofoam, etc.) may be used in addition to or in place of the VIPs 22. In some embodiments, the subassembly 20 may be a single continuous unit. In other embodiments, two (or more VIPs 22) may be formed as a single unit.

In particular embodiments, each VIP 22 includes a core material (e.g., glass fiber, foam material, silica, etc.) provided in a multi-layered envelope, for example, as known in the art. The envelope may include (but is not limited to) any one or combination of one or more layers of: polyethylene terephthalate, polyvinyl alcohol, polyamide, polyolefin, polyvinylidene chloride, metallic foil (e.g., aluminum), and/or other material for preventing air from entering inside the VIP 22. The core material may support the envelope against atmospheric pressure once air from within the envelope is evacuated.

In some embodiments, an insert 17 may be provided between the base 12 and the VIP subassembly 20 to fit (e.g., friction fit) the VIP assembly 20 to the base 12. In particular embodiments, the insert 17 is configured and/or arranged to retain the VIP subassembly 20 in place within the base 12 during handling of the case 10, yet float slightly during a drop to prevent shear between the VIP subassembly 20 and the base 12, which could damage the VIP subassembly 20. The insert 17 may be a foam or the like for cushioning the VIP subassembly 20 (and/or other components of the case 10), for example, caused by impacts (e.g., from dropping the case 10). In some embodiments, the insert 17 may be a thermal insulator.

The liner 30 may be fitted inside an interior volume 24 of the VIP subassembly 20. The liner 30 may protect the VIPs 22 from damage (e.g., from other components of the case 10). In some embodiments, the liner 30 may be configured to have thermal insulation (or thermal conductive) properties. The liner 30 may define an interior volume 34. In some embodiments, the liner 30 includes an outer peripheral edge 32 that is arranged over an upper surface of the VIP subassembly 20. In particular embodiments, the liner 30 is made of a rigid material, such as (but not limited to) plastic, metal, glass, composite material, resin, etc., to protect the VIPs 22 from damage. In some embodiments, a liner 37, which may be made of a similar material as the liner 30, may be arranged on the lid 14 to protect the VIP 22 provided on the lid 14. In various embodiments, one or more of the liners 30, 37 may be configured for removal from the case 10, for example, to allow inspection of the VIPs 22, cleaning of the liners 30, 37, replacement of the liners 30, 37, and/or the like.

In some embodiments, the lid 14 includes a gasket 16 arranged to contact and seal against a surface of a portion or component of the case 10 (e.g., a surface of the liner 30) when the lid 14 is closed on the base 12. In other embodiments, the gasket 16 is arranged on the case 10 to contact and seal against a surface of the lid 14 when the lid 14 is closed on the base 12. In yet other embodiments, the gasket 16 seals against both the lid 14 and the base 12 (or other portion of the case 10). In particular embodiments, the gasket 16 has a mushroom-shaped cross-section (when uncompressed), which has a rounded head portion that is compressed against the opposing surface when the lid 14 is closed on the base 12. In other embodiments, the gasket 16 may have any suitable cross-section. In some embodiments, the gasket 16 includes compressible material (e.g., fiberglass) within its interior volume. In some embodiments, the interior volume of the gasket 16 is generally hollow.

Figure 4:
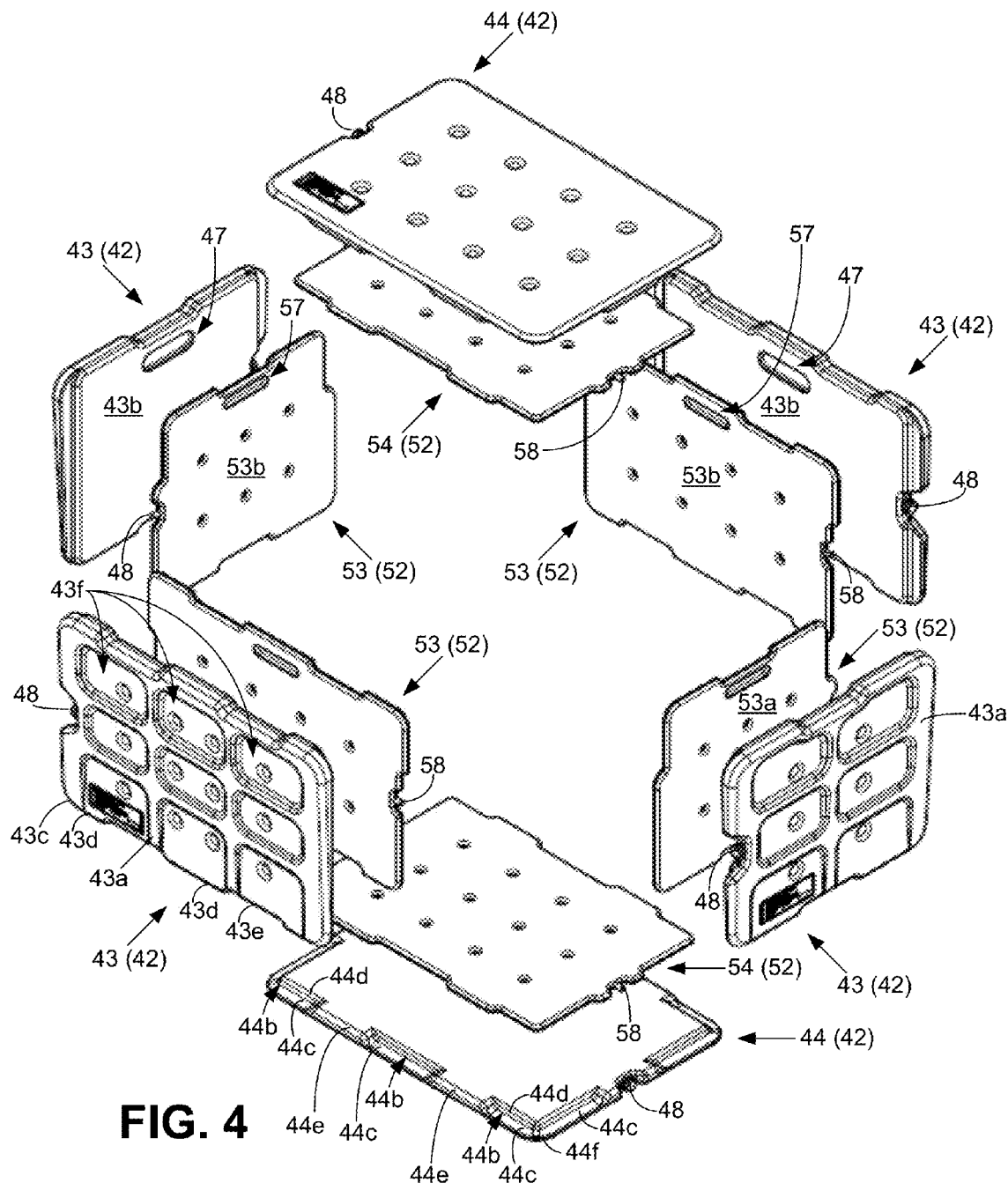
FIG. 4 is an exploded view of a portion of the thermal management case of FIG. 1.
Figure 5:
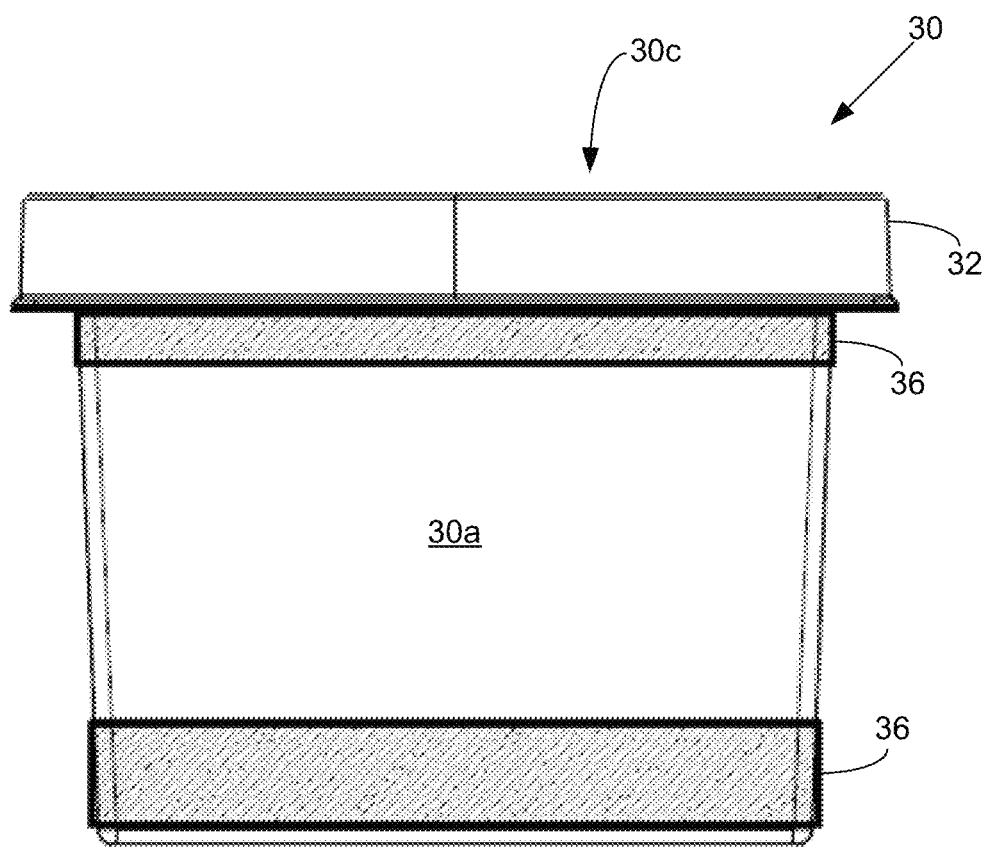
FIG. 5 is a view of a portion of a thermal management case according to various embodiments of the disclosure.
Figure 6:
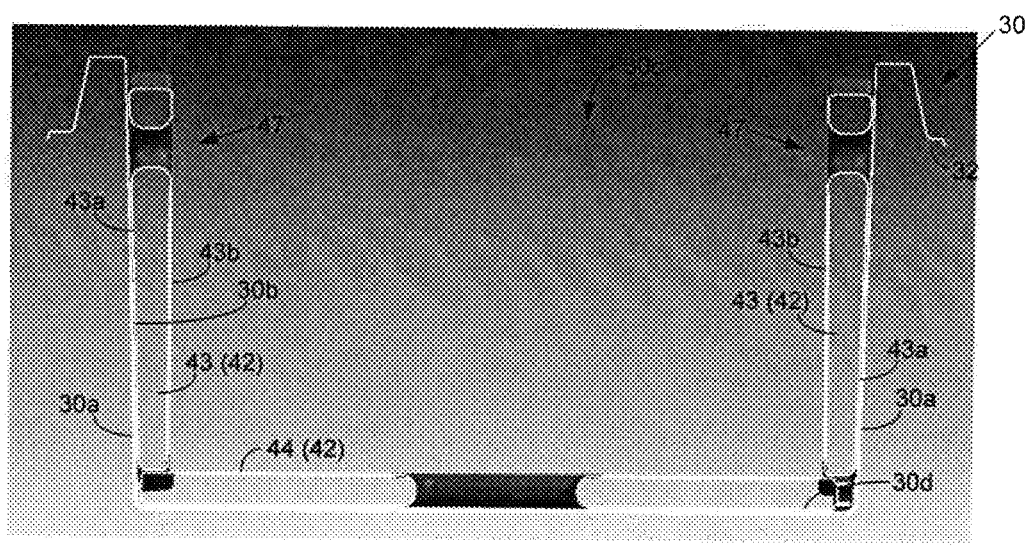
FIG. 6 is a view of a portion of a thermal management case according to various embodiments of the disclosure.
Figure 7:
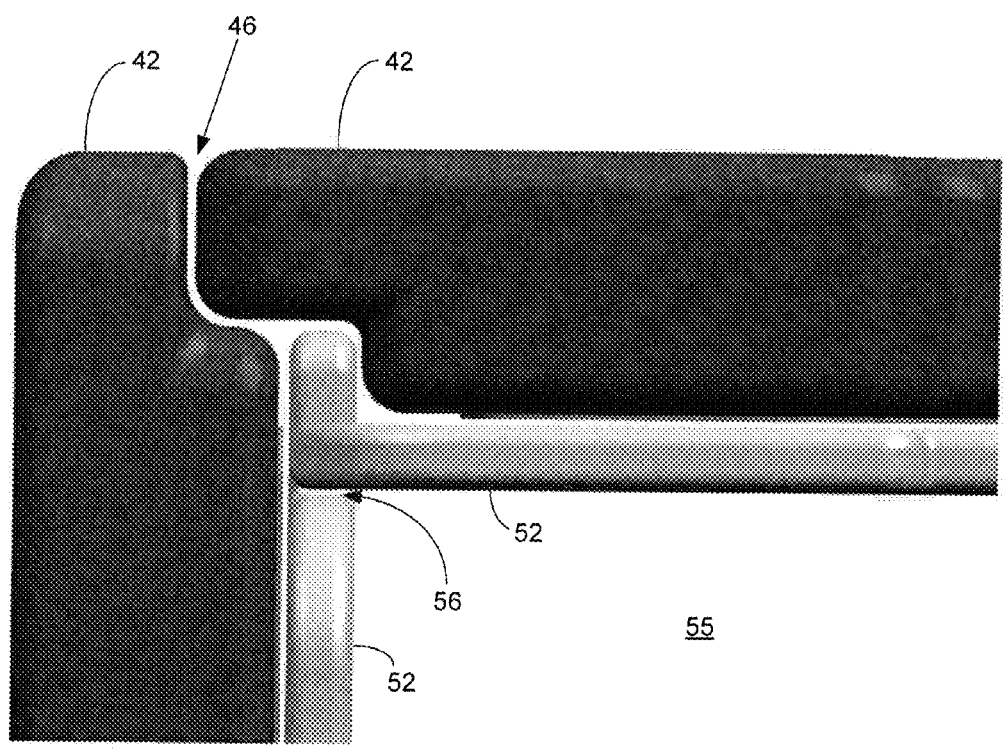
FIG. 7 is a view of a portion of a thermal management case according to various embodiments of the disclosure.

FIG. 4 illustrates an exploded view of the outer container 40 and the inner container 50. With reference to FIGS. 1-4, the one or more layers of panels of phase change material (PCM), such as the outer container 40 and the inner container 50, may be provided in the interior volume 34 of the liner 30.

A primary PCM panel 42 (e.g., a double-walled container) or bottle includes an interior volume containing a primary (first) PCM. In some embodiments, the primary PCM panel 42 may have a generally rectangular form. However, in other embodiments, the primary PCM panel 42 may assume any suitable shape or size. The primary PCM panel 42 may be made of any suitable material (e.g., plastic, metal, glass, resin, composite material, etc.) for containing the primary PCM within the interior volume of the primary PCM panel 42. Multiple primary PCM panels 42 may be placed in the interior volume 34 of the liner 30 to form the outer PCM container 40 nested in the interior volume 34 of the liner 30. For example, six separate primary PCM panels 42 may form a bottom, a top, and four sides of the outer PCM container 40. For instance, a bottom primary PCM panel 44, a top primary PCM panel 44, and four side primary PCM panels 43 may form the outer PCM container 40. In some embodiments, two or more PCM panels 42 may be fixed or formed as a single unit.

A buffer PCM panel 52 (e.g., a double-walled container) or bottle includes an interior volume containing a buffer (second) PCM. In some embodiments, the buffer PCM panel 52 may have a generally rectangular form. However, in other embodiments, the buffer PCM panel 52 may assume any suitable shape or size. The buffer PCM panel 52 may be made of any suitable material (e.g., plastic, metal, glass, resin, composite material, etc.) for containing the buffer PCM within the interior volume of the buffer PCM panel 52. Multiple buffer PCM panels 52 may be placed in an interior volume 45 of the outer PCM container 40 to form the inner PCM container 50 nested in the interior volume 45 of the outer PCM container 40. For example, six separate buffer PCM panels 52 may form a bottom, a top, and four sides of the inner PCM container 50. For instance, a bottom buffer PCM panel 54, a top buffer PCM panel 54, and four side buffer PCM panels 53 may form the inner PCM container 50. In some embodiments, two or more PCM panels 52 may be fixed or formed as a single unit.

The inner PCM container 50 may define a payload volume 55 for receiving the one or more articles (also referred to as payload) to be shipped. The buffer PCM panels 52 may inhibit the article(s) in the payload volume 55 from being thermally damaged by the primary PCM panels 42. For example, the buffer PCM panels 52 may inhibit the article(s) from being chilled below a minimum temperature while the primary PCM panels 42 warm up to their phase change temperature.

The PCM panels 42, 52 may be filled with PCMs through an opening in each of the PCM panels 42, 52. In some embodiments, the opening is permanently sealed after filling the PCM panel 42, 52. In other embodiments, the opening is re-sealable such that the PCM panel 42, 52 can be emptied and/or refilled through the opening. For example, the PCM panels 42, 52 may include a cap, plug, or the like.

Figure 8:
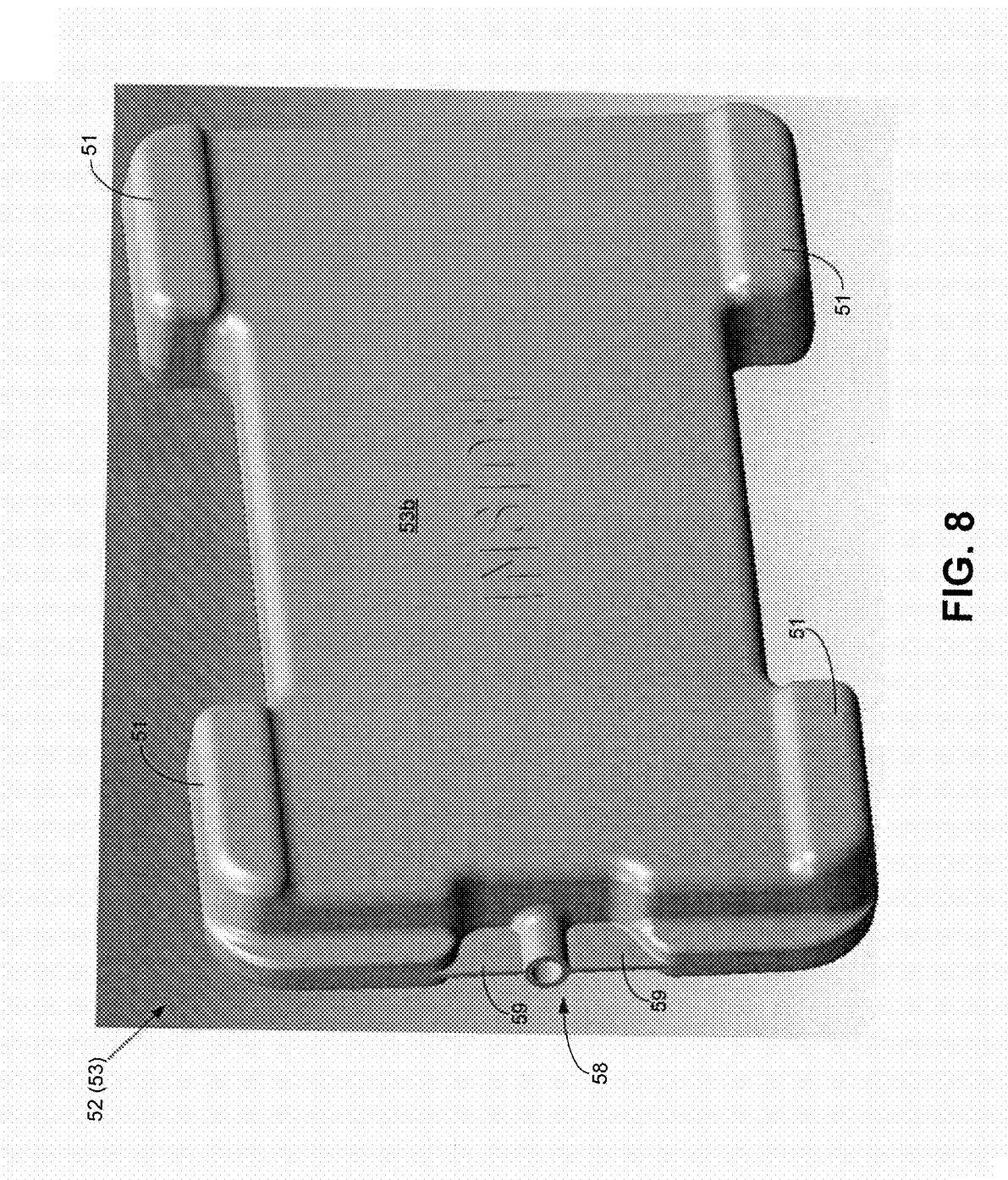
FIG. 8 is a view of a portion of a PCM panel for a thermal management case according to various embodiments of the disclosure.

In some embodiments, one or more (or each) PCM panel 42, 52 may include a neck 48 or 58 having the opening for filling the PCM panel 42, 52. In particular embodiments, a webbing (e.g., 59 in FIG. 8) may be provided on one or more sides of the neck 48, 58. The webbing 49 may extend from the neck 48, 58 to an outer peripheral surface of the PCM panel 42, 52. In some embodiments, the webbing 49 can be trimmed or otherwise removed from the PCM panel 42, 52, for instance, during manufacture thereof. In other embodiments, the webbing 49 may remain on the PCM panel 42, 52 during use thereof. In such embodiments, for example, the webbing 49 may reduce air flow past the neck 48, thus reducing unwanted air circulation in the case 10.

In some embodiments, the primary PCM is a different PCM from the buffer PCM. For instance, in particular embodiments, the primary PCM is water/ice, which changes phases at around 0 degrees Celsius. In some embodiments, the buffer PCM is a custom PCM, such as Phase 5™, which is designed and manufactured by TCP Reliable, Inc., and has a phase change point (melting/freezing point) at around 5° C. In such embodiments, the primary PCM and the buffer PCM may be used to maintain a temperature range, for example, of 2° C. and 8° C. in the payload volume 55 of the inner PCM container 50. In other embodiments, other suitable PCM may be used as the primary PCM and/or the buffer PCM. In further embodiments, the primary PCM is a same PCM as the buffer PCM.

In some embodiments, the primary PCM is conditioned (e.g., prior to insertion in the case 10) to a phase that is different from a phase to which the buffer PCM is conditioned. For example, the primary PCM may be conditioned to be in a solid phase by freezing the primary PCM, and the buffer PCM may be conditioned to be in a liquid phase by heating the buffer PCM (e.g., leaving the buffer PCM at room temperature). As another example, the primary PCM may be conditioned to be in a liquid phase by heating the primary PCM (e.g., leaving the primary PCM at room temperature), and the buffer PCM may be conditioned to be in a solid by freezing the buffer PCM. In other embodiments, the buffer PCM and the primary PCM are conditioned to be in a same phase (e.g., both in a solid phase or a liquid phase).

Throughout various embodiments, selection of the primary PCM and/or the buffer PCM (and/or phases thereof) may be based on one or more factors, such as (but not limited to), the desired temperature range in the payload volume 55, the anticipated ambient temperatures (i.e., temperatures external the case 10) during shipping of the case 10, the expected duration of shipping the case 10, thermal properties of the PCMs, VIPs, and/or other components of the case 10, and/or the like.

Throughout various embodiments, in preparation to ship the payload in the case 10, the primary PCM panels 42 may be conditioned by a shipper to a temperature (e.g., −20 degrees Celsius) below a minimum temperature of a predetermined temperature range (e.g., 2-8 degrees Celsius or other desired ranged) suitable for shipping the payload. The buffer PCM panels 52 may be conditioned by the shipper to a temperature (e.g., 22 degrees Celsius) that is within or higher than the predetermined range.

With reference to FIGS. 1-6, in various embodiments, the liner 30 may be tapered (drafted) such that an inner surface 30b of the liner 30 extends at an angle inward toward a center of the liner 30 (or base 12). As such, a bottom surface 30d of the liner 30 has a smaller area than that of the open end 30c of the liner 30 through which the PCM panels 42, 52 may be placed into the interior volume 34 of the liner 30. In some embodiments, at least a portion of an outer surface 30a of the liner 30 may be in direct contact with the VIP subassembly 20. For instance, the VIP subassembly 20 may be tapered to match the liner 30. In other embodiments, at least a portion of the VIP subassembly 20 is spaced apart from the liner 30 to form a gap 21 between a portion of the VIP subassembly 20 and the liner 30. In particular embodiments, the gap 21 between the VIP subassembly 20 and the liner 30 is substantially hollow. In other embodiments, the gap 21 contains a thermal insulator (e.g., insulating foam) and/or a cushioning material. For instance, in some embodiments, a foam strip (or tape) 36 or the like is provided in the gap 21 between the VIP subassembly 20 and the liner 30. The foam strip 36 may be arranged on (e.g., adhered on), for example, the outer surface 30a of the liner 30. The foam strip 36 may also provide cushioning for the payload and/or components of the case 10, for example, caused by impacts (e.g., dropping the case 10). In particular embodiments, the foam strip 36 may be provided near a parting line 15 (e.g., where the lid 14 meets the base 12) of the case 10 to insulate against ambient (external) temperatures. In other embodiments, the foam strip 36 may be arranged along any suitable portion(s) of the liner 30. Thus, according to various embodiments, the foam strip 36 may serve multiple functions including thermal insulation and cushioning. In other embodiments, different materials for cushioning and/or thermal insulating may be used. For instance, a first material that is a thermal insulator may be used near the parting line 15, and/or a second material that is a cushioning material may be used near the bottom of the case 10. In some embodiments, the foam strip 36 is provided on the liner 30 before the liner 30 assembled with the VIP subassembly 20.

In some embodiments, at least some of the primary PCM panels 42, such as the side primary PCM panels 43, may be tapered to match and fit against the liner 30 (or other tapered surface) (e.g., FIGS. 9A-9F). For instance, an outer surface 43a of the side primary PCM panel 43 may be in direct contact with the liner 30 (or other tapered surface). In particular embodiments, an inner surface 43b, opposite the outer surface 43a, is not tapered (e.g., FIGS. 9A-9E). Thus, for instance, the inner surface 43b is orthogonal (perpendicular) to the bottom primary PCM panel 44, and the outer surface 43a is at a non-orthogonal angle from the bottom primary PCM panel 44 at any suitable angle such, as but not limited to, a two-degree angle (or other desired angle), such that the side primary PCM panel 43 is tapered by two degrees. Accordingly, in some embodiments, the interior volume 45 of the outer PCM container 40 is generally orthogonal (e.g., a box-like structure). The payload may be placed in the interior volume 45. In other embodiments, the inner PCM container 50 may be placed in the interior volume 45 and at least partially surrounds and defines the payload volume 55 for receiving the payload.

Figure 9A:
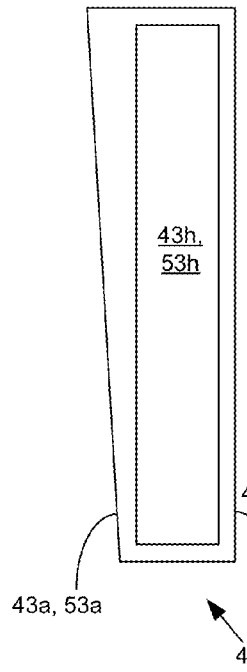
FIGS. 9A-9H are cross-section views of various phase change material panels according to various embodiments of the disclosure.
Figure 9B:
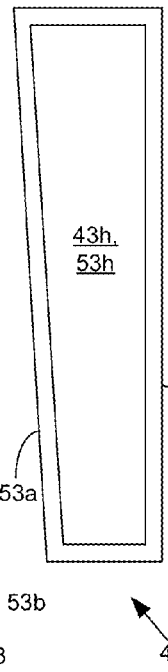
Figure 9C:
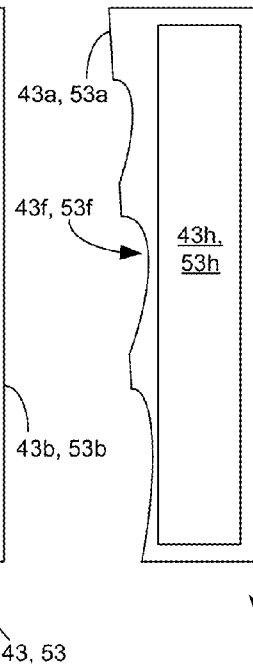
Figure 9D:
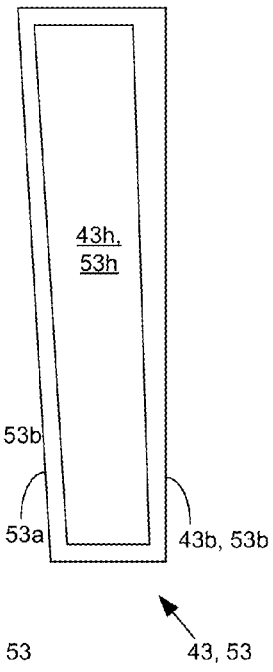
Figure 9E:
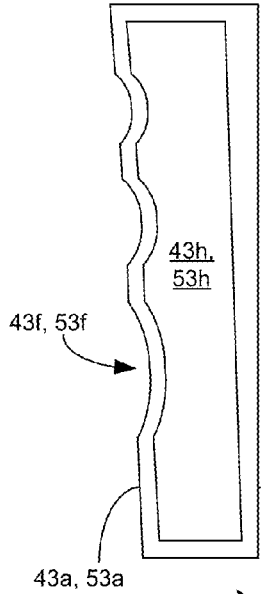
Figure 9F:
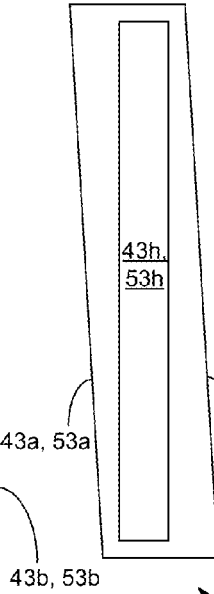
Figure 9G:
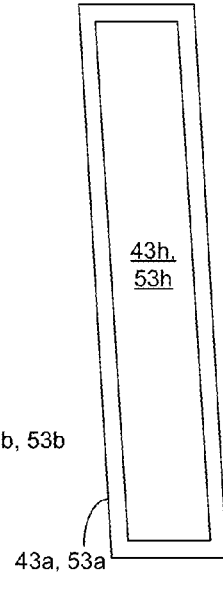

In some embodiments, the inner surface 43b is tapered (e.g., FIGS. 9F-9G). Thus, in such embodiments, the inner surface 43b is angled at a non-orthogonal angle relative to the bottom primary PCM panel 44, for example (but not limited to), at a two-degree angle. In such embodiments, each of the inner surface 43b and the outer surface 43a of the side primary PCM panel 43 is tapered (e.g., two degrees). The taper (angle) of the inner surface 43b may be the same as the taper of the outer surface 43a. In other embodiments, the taper of the inner surface 43b may be different from the taper of the outer surface 43a. The angles of the tapers of each of the outer surface 43b and the inner surface 43b may be any suitable angles such as, but not limited to, one degree and two degrees, respectively (or any other suitable angles).

In further embodiments, at least some of the buffer PCM panels 52, such as the side primary PCM panels 53, may be tapered to match and fit to the side primary PCM panels 43 (or other tapered surface). For instance, an outer surface 53a of the side buffer PCM panel 53 may be in direct contact with the inner surface 43b of the side primary PCM panel 43 (or other tapered surface). In particular embodiments, an inner surface 53b, opposite the outer surface 53a, is not tapered. Thus, for instance, the inner surface 53b is orthogonal (perpendicular) to the bottom buffer PCM panel 54, and the outer surface 53a is at a non-orthogonal angle from the bottom buffer PCM panel 544 at any suitable angle such, as but not limited to, a two-degree angle (or other desired angle), such that the side buffer PCM panel 53 is tapered by two degrees. Accordingly, in some embodiments, the payload volume 55 of the inner PCM container 50 is generally orthogonal (e.g., a box-like structure). The payload may be placed in the payload volume 55.

In yet further embodiments, the inner surface 53b is tapered. Thus, in such embodiments, the inner surface 53b is angled at a non-orthogonal angle relative to the bottom buffer PCM panel 54, for example (but not limited to), at a two-degree angle. In such embodiments, each of the inner surface 53b and the outer surface 53a of the side buffer PCM panel 53 is tapered (e.g., two degrees). The taper (angle) of the inner surface 53b may be the same as the taper of the outer surface 53a. In other embodiments, the taper of the inner surface 53b may be different from the taper of the outer surface 53a. The angles of the tapers of each of the outer surface 53b and the inner surface 53b may be any suitable angles such as, but not limited to, one degree and two degrees, respectively (or any other suitable angles, such as 0.5 degrees, three degrees, five degrees, etc.).

Thus, in various embodiments, some or all of the tapered side PCM panels 43 (and/or 53) have a bottom end having a thickness that is less than a thickness of a top end of such panels. Tapering one or more of the PCM panels 43, 53 provides more PCM near the top of the base 12 (e.g., near the parting line 15 of the case 10 where the lid 14 closes on the base 12) than at the bottom of the case 10. More PCM is desirable near the top of the base 12 to address heat influx through the parting line 15 of the case 10. As such, by strategically placing a greater amount of PCM at locations where the PCM is most needed, less PCM may be used in the case 10 at other locations (e.g., bottom of the base 12), while maximizing the thermal benefits of the PCM.

In various embodiments, each of the tapers of the inner surface 30b of the liner, the outer surface 43a of the side primary PCM 43, the inner surface 43b of the side primary PCM 43, the outer surface 53a of the side buffer PCM 43, and the inner surface 53b of the side buffer PCM 53 may be the same (e.g., each tapered at two degrees). In other embodiments, one of more of such surfaces (or surfaces of components therebetween) may be different from the taper of the others.

In some embodiments, the interior volumes 43h, 53h of one or more of the side PCM panels 43, 53 may be defined by interior walls having tapered surfaces corresponding to the tapered surfaces 43a, 43b, 53a, 53b of the side PCM panels 43, 53 (e.g., FIGS. 9B, 9D, 9E, 9G). In other embodiments, the interior volumes 43h, 53h of one or more of the tapered side PCM panels 43, 53 may be defined by interior walls having no tapered surface (e.g., a cylindrical interior volume, a box-like interior volume, etc.) (e.g., FIGS. 9A, 9C, 9F). In yet other embodiments, the interior volumes 43h, 53h of one or more of the tapered side PCM panels 43, 53 may be defined by interior walls having tapered surfaces that are tapered at different angles from the corresponding tapered surfaces 43a, 43b, 53a, 53b of the side PCM panels 43, 53. In some embodiments, PCM panels (e.g., side, top, and/or bottom panels) that are not tapered may include tapered walls defining one or more portions of the interior volume 43h, 53h within. Accordingly, more PCM may be located at a top end of such PCM panels than at a bottom end of such PCM panels.

In some embodiments, the side PCM panels 43 (and/or 53) may include hollow sections 43f, 53f or recesses, which are defined by rib or wall portions of the side PCM panels 43, 53 and extended into the interior volumes 43h, 53h of the side PCM panels 43, 53 such that more PCM is provided near the top of the base 12 (e.g., near the parting line 15 of the case 10 where the lid 14 closes on the base 12) than at the bottom of the base 12 (e.g., FIG. 9E). For example, larger (and/or more) hollow sections 43f, 53f may be provided in the side PCM panel 43, 53 at the bottom of the side PCM panel 43, 53 than near the top of the side PCM panel 43, 53, thus displacing more PCM in the interior volume 43h, 53h at the bottom of the side PCM panel 43, 53 (e.g., FIG. 9E).

In other embodiments, the interior volume 43h, 53h of the side PCM panel 43, 53 is generally uniform from near the bottom end of the side PCM panel 43, 53 to near the top end of the side PCM panel 43, 53 such that a thickness of PCM (e.g., 1") in the interior volume 43h, 53h of the side PCM panel 43, 53 at the bottom end of the side PCM panel 43, 53 is a same thickness (e.g., 1") as at the top end of the side PCM panel 43, 53 (e.g., FIG. 9C). In such embodiments, for example, the interior volume 43h, 53h may be generally cylindrical, rectangular, or the like. When used with the tapered liner 30, because the side PCM panel 43 (and/or 53) is thicker near the top of the base 12, the recess(es) 43f extend deeper into the side PCM panel 43 near the top end of the side PCM panel 43 than near the bottom end of the side PCM panel 43. In various embodiments, a plurality of hollow sections 43f are provided in the side PCM panels 43 (and/or 53). The plurality of hollow sections 43f may better regulate air flow and/or strengthen the panel (e.g., in a drop-test situation) relative to a single, larger hollow section.

Figure 9H:
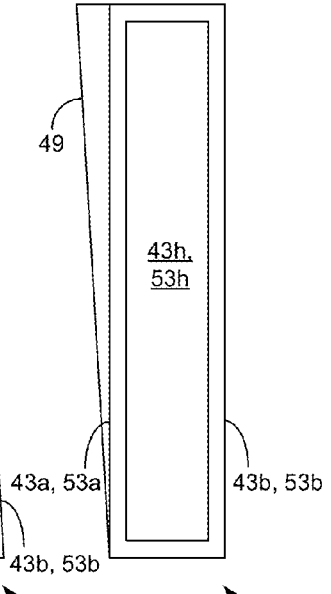

In some embodiments, the side PCM panel 43 (and/or 53) is not tapered to match the liner 30 (e.g., the outer surface 43a is not tapered, the outer surface 43a is tapered at a different angle than that of the liner 30, etc.). In such embodiments, an insert 49 may be provided between the side PCM panel 43 and the tapered surface (e.g., inner surface of the liner 30) (e.g., FIG. 9H). The insert 49 may have an outer surface that matches the taper of the tapered surface of the liner 30 and an inner surface that matches the outer surface 43a (tapered or not tapered) of the side PCM panel 43. The insert 49 may be made of any suitable material (e.g., plastic, metal, glass, composite material, ceramic, foam, etc.). In some embodiments, the insert 49 may be a thermal insulator. In other embodiments, the insert 49 may be a thermal conductor.

In various embodiments, a first amount of primary PCM may be used in a given one of the primary PCM panels 42 and a second amount of primary PCM may be used in a given one of the buffer PCM panels 52 (e.g., the buffer PCM panel adjacent the given primary PCM panel). The amount may be with respect to volume, weight, thickness (in a direction toward the adjacent PCM panel), and/or the like. In some embodiments, the first amount is different from the second amount. For example, the primary PCM panel 42 may include an approximately 1" thick amount of primary PCM, and the buffer PCM panel 52 may include an approximately 0.5" thick amount of buffer PCM. In other embodiments, other proportions may be selected based on factors, such as (but not limited to), types of PCMs used, desired temperature range for the payload, ambient/external temperatures, phase and/or temperature of PCMs (e.g., when inserted into the case 10, and/or the like. For instance, the first amount and second amount may be selected based on the sensible energy needed to get the primary PCM from the temperature to which it is conditioned (e.g., −20 degrees Celsius) to its phase change temperature (e.g., 5 degrees Celsius), and the energy (sensible energy plus latent energy) in the buffer PCM so that the buffer PCM is cooled down and then frozen by the primary PCM. In other embodiments, the first amount is the same as the second amount.

With reference to FIGS. 1-9H, in various embodiments, the bottom primary PCM panel 44 may include one or more recesses 44b for receiving a portion 43c of each of the side primary PCM panels 43. In particular embodiments, multiple recesses 44b are provided. Each recess 44b may be separated by a portion 44e of the bottom primary PCM panel 44. The portions 44e may be received into corresponding recesses 43d of the side primary PCM panels 43. As such, the recesses 44b may be shaped or keyed to indicate which side primary PCM panel 43 (and portion(s) 43c thereof) is inserted into each of the recesses 44b. For instance, the bottom primary PCM panel 44 may include three recesses 44b on each lengthwise side of the bottom primary PCM panel 44, as well as two recesses 44b on each of widthwise side of the bottom PCM panel 44. As such, the side primary PCM panels 43 that are the lengthwise sides of the outer PCM container 40 each include three portions 43c or sections for insertion into the corresponding recesses 44b of the bottom primary PCM panel 44. Likewise, the side primary PC panels 43 that are the widthwise sides of the outer PCM container 40 each include two portions 43c or sections for insertion into the corresponding recesses 44b of the bottom primary PCM panels. Such recesses 44b may provide easy insertion of the portions 43c of the side primary PCM panels 43 into the recesses 44b to form the outer PCM container 40. For instance, the recesses 44b allow the side primary PCM panels 43 to be inserted in the case 10 with one hand. Moreover, because the recesses 44b cause the side primary PCM panels 43 to stay in place, subsequent side primary PCM panels 43 may be inserted with one hand. It should be noted that any number of recesses 44b and/or portions 43c may be used. In some embodiments, the recesses 44b may have similar sizes or shapes to each other. In other embodiments, the recesses 44b may have different sizes or shapes from each other. For example, a recess 44b along the lengthwise side may be twice a length of a recess 44b along a widthwise side. Thus, the side primary PCM panel 43 that is one of the lengthwise sides of the outer PCM container 40 may include a corresponding portion 43c that is twice a length of a portion 43c of the side primary PCM panels 43 that are the widthwise sides of the outer PCM container 40.

In some embodiments, the top primary PCM panel 44 may include one or more recesses 44b, for example, as discussed with respect to the recesses 44b of the bottom primary PCM panel 44. For example, the top primary PCM panel 44 may include keyed or shaped recesses 44b for receiving corresponding portions of the side primary PCM panels 43. By inserting the corresponding portions of the side primary PCM panels 43 in the keyed recesses 44b of the top primary PCM panel 44, the top primary PCM panel 43 may be retained in place during transit of the case 10.

In various embodiments, the bottom primary PCM panel 43 is configured to urge the side primary PCM panels 44 to rest or otherwise be pressed against an opposing surface (e.g., the liner 30). In particular embodiments, one or more of the recesses 44b include a tapered surface for urging the side primary PCM panels 43 against the opposing surface. The tapered surface, for example, may be a bottom surface 44c of the recess 44b. In some embodiments, the tapered surface 44c may be a wall portion 44d defining the recess 44b. The tapered surface may be angled at an angle corresponding to the tapered outer surface 43a, the inner surface 30b of the liner 30, and/or the like. Accordingly, such tapered recesses 44b may provide easy insertion of the portions 43c of the side primary PCM panels 43 into the recesses 44b to form the outer PCM container 40. For instance, the recesses 44b allow the side primary PCM panels 43 to be inserted in the case 10 with one hand. Moreover, because the recesses 44b cause the side primary PCM panels 43 to stay in place, subsequent side primary PCM panels 43 may be inserted with one hand.

In some embodiments, the bottom and/or top buffer PCM panel(s) 54 (and/or side buffer PCM panels 53) may include one or more of the configurations discussed with respect to the bottom and/or top buffer PCM panel(s) 44 and/or side buffer PCM panels 53). For example, the bottom buffer PCM panel 44 may include tapered and/or keyed recesses for urging the side buffer PCM panels 53, which are received in the recesses, against an opposing surface (e.g., a tapered inner surface 43*b* of an adjacent side primary PCM panel 43). Such configurations, for instance, may provide easy insertion of the side PCM panels 53, securing of the top buffer PCM panel 54 during transport of the case 10, and/or the like.

According to various embodiments, when the primary PCM panels 42 and the buffer PCM panels 52 are fit together, air flow paths 46, 56 (e.g., FIG. 7) may be created along the edges of the panels where each PCM panel meets at least one other PCM panel (e.g., a joint where the top primary panel 54 meets two side primary PCM panels 43). In some embodiments, one or more of the PCM panels 42, 52 are configured and/or arranged to minimize air flow along such paths. In particular embodiments, the stepped portions (e.g., 43*c*, 44*e*) of the primary PCM panels 42 and the buffer PCM panels 52 cause the panels to fit together in a manner that creates a convoluted (e.g., non-linear) path that minimizes air flow from outside the outer PCM container 40 (e.g., in the interior volume 34 of the liner 30), through adjacent primary PCM panels 42, into the interior volume 45, through adjacent buffer PCM panels 52, and into the payload volume 55. The path may include multiple turns, obstructions, or the like for minimizing air flow therealong. The turns, for instance, may be provided by the stepped portions (e.g., 43*c*, 44*e*) of the PCM panels 42, 52. Other embodiments have shapes other than a stepped path, such as (but not limited to), a zigzag path, a meandering path, a parabolic path, a snake-like path, and/or the like. For example, one or more of the panels may include teeth that mesh with teeth of another panel. In some embodiments, some of the buffer PCM panels 52 (and/or the primary PCM panels 42) include feet 51 (e.g., FIG. 8) arranged near one or more of the edges or corners of such panels. The feet 51 may be raised surfaces or other supported element arranged to block the path. In particular embodiments, air flow is not completely inhibited by the convoluted path or obstructions (e.g., feet 51), but is merely reduced to reduce a rate at which air circulates from outside the outer PCM container 40 into the payload volume 55.

In various embodiments, one or more of the PCM panels 42 (and/or 52) may include rounded corners (e.g., 44*f*). The rounded corners allow the PCM panels to be more resistant to damage if dropped, for example. In addition, the rounded corners make the PCM panels easier to handle and manufacture. In addition, the rounded corners eliminate PCM in corners of the PCM panels. Eliminating excess PCM (and corresponding material of the PCM panels for containing such PCM) results in lighter and less expensive PCM panels. In other embodiments, the corners of the PCM panels are not round.

In some embodiments, the primary PCM panels 42 are in direct thermal contact with the buffer PCM panels 52. For instance, the PCM panels 42, 52 may be in direct contact with each other. The PCM panels 42, 52 may be spaced apart and be separated by air or the like. In some embodiments, a thermal conductive material may be provided between the PCM panels 42, 52. In some embodiments, the conductive material may be arranged completely between the PCM panels 42, 52. In other embodiments, the conductive material is at least partially recessed into a recess of one or more of the PCM panels 42, 52. The conductive material may be flush with a surface of the PCM panel in which the conductive material is recessed. In other embodiments, the conductive material extends at least partially out of the recess such that a portion extending out of the recess is arranged between the PCM panels 42, 52. Accordingly, for example, only the portion extending out of the recess would contact the opposing PCM panel.

In other embodiments, an insulation material is provided between the PCM panels 42, 52. In some embodiments, the insulation material may be arranged completely between the PCM panels 42, 52. In other embodiments, the insulation material is at least partially recessed into a recess of one or more of the PCM panels 42, 52. The insulation material may be flush with a surface of the PCM panel in which the insulation material is recessed. In other embodiments, the insulation material extends at least partially out of the recess such that a portion extending out of the recess is arranged between the PCM panels 42, 52. Accordingly, for example, only the portion extending out of the recess would contact the opposing PCM panel.

In various embodiments, the primary PCM panels 42 and/or the liner 30 (or other surface) may be configured and/or arranged to include (but is not limited to) any one or more of the features and/or arrangements described with respect to the primary PCM panels 42 and the buffer PCM panels 52.

In various embodiments, the PCM panels 42, 52 may be coded to identify their content, position, placement order, or other information. The PCM panels 42, 52 may be coded in any suitable manner including, but not limited to, color, patterns, sizes, shapes, textures, labeling, text (e.g., "SIDE," "TOP", "INSIDE"/"OUTSIDE", etc.), and/or the like. For example, the primary PCM panels 42 may be a first color (e.g., blue), and the buffer PCM panels 52 may be a second color (e.g., yellow). As another example, the bottom and top primary PCM panels 44 (and/or top buffer PCM panels 54) may include a first design or pattern (e.g., cross-hatched pattern), and the side buffer PCM panels 43 (and/or side buffer PCM panels 53) may include a second design or pattern (e.g., solid or no pattern). As yet another example, each primary PCM panel 42 (and/or buffer PCM panel 52) may be coded to identify their placement order. For instance, the bottom primary PCM panel 44 may include a number "1," the bottom buffer PCM panel 54 may include a number "2," the side primary PCM panels 43 may each include a number "3" (or each include one of numbers "3" through "6"), the side primary PCM panels 53 may each include a number "4" (or each include one of numbers "7" though "10"), the top buffer PCM panel 44 may include a number "5" (or a number "11"), and the top primary PCM panel 44 may include a number "6" (or a number "12"). Such a numbering scheme is exemplary as any suitable numbering or lettering scheme (or other scheme) could be used.

In various embodiments, one or more of the PCM panels 42, 52 (e.g., side primary PCM panel 43, side buffer PCM panel 53) may include an opening 47, 57 through the one or more PCM panels 42, 52. The opening may be, for example, a handle hole for improving handling of the PCM panels, for example, during insertion thereof into the case 10. The opening also provides an intuitive cue as to how the PCM panels 42, 52 should be placed in the case 10. In embodiments in which at least some of the primary PCM panels 42 and the buffer PCM panels 52 have openings (e.g., handle holes), the openings in the primary PCM panels 42 may be in line with the openings in the adjacent buffer PCM panels 52. In other embodiments, the openings in the primary PCM panels 42 are not in line with the openings in the adjacent buffer PCM panels 52. In particular embodiments, the openings in the buffer PCM panels 52 are smaller or are otherwise configured to prevent an object from passing through one of the openings in one of the buffer PCM panels 52 and contacting one of the primary PCM panels 42. In addition, this may limit air flow from the primary PCM panels 42 to the payload through the openings in the buffer PCM panels 52.

In various embodiments, both primary PCM panels 42 and buffer PCM panels 52 are implemented in the case 10. In other embodiments, only the primary PCM panels 42 are used (i.e., no buffer PCM panels 52 are provided between the payload and the primary PCM panels 42). In such embodiments, for example, the primary PCM panels 42 may be frozen to a temperature that would otherwise damage the payload, and then placed at room temperature (or otherwise warmed) to bring the PCM in the primary PCM panels 42 to its phase change temperature before inserting the primary PCM panels in the case 10 with the payload.

In various embodiments, one or more of the PCM panels 42, 52 may be configured to provide an indication of a temperature of the PCM in the PCM panels 42, 52. In particular embodiments, the indication may be that a desired temperature, such as a phase change temperature, has been reached. In some embodiments, such PCM panels may be made of or include a temperature-reactive material that changes color or appearance based on temperature (e.g., temperature of the PCM within the PCM panels). For example, after removing the frozen primary PCM panel 42, the primary PCM panel 42 may be a made of a material that changes color when the phase change material in the primary PCM panel 42 reaches its phase change point (or other desired temperature). In other embodiments, such PCM panels may include a temperature sensor for sensing temperature (or other parameter(s) indicative or for inferring temperature) of the primary PCM panel 42 and/or PCM within the primary PCM panel 42. Any suitable feedback device, which may be a visual, audible, and/or tactile device, may be configured to provide an indication of the temperature (or condition of the PCM) based on the sensed temperature or the like.

In various embodiments, the case 10 implements passive temperature control. In some embodiments, the case 10 may also include active temperature control systems, such as compressor-driven systems, Peltier-based devices, heater/cooler devices, and/or the like.

The embodiments disclosed herein are to be considered in all respects as illustrative, and not restrictive of the invention. The present invention is in no way limited to the embodiments described above. Various modifications and changes may be made to the embodiments without departing from the spirit and scope of the invention. The scope of the invention is indicated by the attached claims, rather than the embodiments. Various modifications and changes that come within the meaning and range of equivalency of the claims are intended to be within the scope of the invention.

What is claimed is:

1. A thermal management system, the system comprising:
   a case including a base having a base interior and a base bottom, the base bottom having a center;
   an insulation material provided within the base interior, the insulation material defining an interior volume of the insulation material;
   a liner arranged in the interior volume of the insulation material, the liner having an inner surface that extends at an obtuse angle relative to the base bottom, to taper inward toward the center of the base bottom;
   an outer container of phase change material provided in the liner, the outer container comprising a plurality of outer panels containing a first phase change material, the plurality of outer panels comprising a bottom outer panel, a top outer panel, and side outer panels; and
   an inner container of phase change material provided in the outer container, the inner container comprising a plurality of inner panels containing a second phase change material;
   wherein an outer surface of each of the side outer panels is parallel with the inner surface of the liner.

2. The system of claim 1, wherein, for each of the side outer panels, a thickness between the outer surface of the side outer panel and an inner surface of the side outer panel at a bottom end of the side outer panel is less than a thickness between the outer surface and the inner surface at a top end of the side outer panel.

3. The system of claim 1, wherein, for each of the side outer panels, a thickness between the outer surface of the side outer panel and an inner surface of the side outer panel increases from a bottom end of the side outer panel to a top end of the side outer panel.

4. The system of claim 1, wherein, for each of the side outer panels, an inner surface of the side outer panel is perpendicular to the bottom outer panel, and the outer surface of the side outer panel is not perpendicular to the bottom outer panel.

5. The system of claim 1, wherein, for each of the side outer panels, an inner surface of the side outer panel is not parallel with the inner surface of the liner.

6. The system of claim 1,
   the plurality of inner panels comprising a bottom inner panel, a top inner panel, and side inner panels;
   wherein an outer surface of each of the side inner panels is parallel with the inner surface of the liner.

7. The system of claim 6, wherein, for each of the side inner panels, a thickness between the outer surface of the side inner panel and an inner surface of the side inner panel at a bottom end of the side inner panel is less than a thickness between the outer surface and the inner surface at a top end of the side inner panel.

8. The system of claim 6, wherein, for each of the side inner panels, a thickness between the outer surface of the side inner panel and an inner surface of the side inner panel increases from a bottom end of the side inner panel to a top end of the side inner panel.

9. The system of claim 6, wherein, for each of the side inner panels, an inner surface of the side inner panel is perpendicular to the bottom outer panel, and the outer surface of the side inner panel is not perpendicular to the bottom outer panel.

10. The system of claim 6, wherein, for each of the side inner panels, an inner surface of the side inner panel is not parallel with the inner surface of the liner.

11. The system of claim 1, wherein the first phase change material is the second phase change material.

12. The system of claim 1, wherein the first phase change material is a different phase change material from the second phase change material.

13. The system of claim 1, wherein the plurality of outer panels of the outer container comprise a plurality of separate panels that are removable from the interior volume of the interior volume of the liner and are separable from each other when outside of the interior volume of the liner.

14. A method of manufacturing a thermal management system, the method comprising:
   providing a case including a base having a base interior and a base bottom, the base bottom having a center;
   providing an insulation material within the case base interior, the insulation material defining an interior volume of the insulation material;
   arranging a liner in the interior volume of the insulation material, the liner having an inner surface that extends at an obtuse angle relative to the base bottom, to taper inward toward the center of the base bottom;

providing an outer container of phase change material in the liner, the outer container comprising a plurality of outer panels containing a first phase change material, the plurality of outer panels comprising a bottom outer panel, a top outer panel, and side outer panels; and providing an inner container of phase change material in the outer container, the inner container comprising a plurality of inner panels containing a second phase change material;

wherein an outer surface of each of the side outer panels is parallel with the inner surface of the liner.

15. A thermal management system, the system comprising:
a case;
an insulation material provided within the case, the insulation material defining an interior volume;
a liner arranged in the interior volume of the insulation material, the liner defining an interior volume;
an outer container of phase change material provided in the interior volume of the liner, the outer container defining an interior volume; the outer container comprising a plurality of outer panels containing a first phase change material, the plurality of outer panels comprising a bottom outer panel, a top outer panel, and side outer panels; and
an inner container of phase change material provided in the interior volume of the outer container, the inner container defining an interior volume in which a payload is to be received, the inner container comprising a plurality of inner panels containing a second phase change material, the plurality of inner panels comprising a bottom inner panel, a top inner panel, and side inner panels;
wherein a first non-linear path is formed between the interior volume of the liner and the interior volume of the outer container where one or more of the outer panels meet at least one other of the outer panels; and
wherein a second non-linear path is formed between the interior volume of the outer container and the interior volume of the inner container where one or more of the inner panels meet at least one other of the inner panels;
the bottom outer panel having at least one recess for receiving a portion of one or more of the side outer panels, the at least one recess and the portion of one or more of the side outer panels defining at least a portion of the first non-linear path.

16. The system of claim 15, the bottom inner panel having at least one recess for receiving a portion of one or more of the side inner panels, the at least one recess of the bottom inner panel and the portion of one or more of the side inner panels defining at least a portion of the second non-linear path.

17. The system of claim 15, the bottom outer panel configured to interlock with the side outer panels along the first non-linear path.

18. The system of claim 17, the bottom inner panel configured to interlock with the side inner panels along the second non-linear path.

19. The system of claim 15, wherein at least one of the inner panels includes a raised portion provided on an inner surface of the at least one of the inner panel, a surface of the raised portion defining a portion of the second non-linear path.

20. A method of manufacturing a thermal management system, the case comprising:
providing a case;
providing an insulation material within the case, the insulation material defining an interior volume;
arranging a liner in the interior volume of the insulation material, the liner defining an interior volume;
providing an outer container of phase change material in the interior volume of the liner, the outer container defining an interior volume; the outer container comprising a plurality of outer panels containing a first phase change material, the plurality of outer panels comprising a bottom outer panel, a top outer panel, and side outer panels; and
providing an inner container of phase change material in the interior volume of the outer container, the inner container defining an interior volume in which a payload is to be received, the inner container comprising a plurality of inner panels containing a second phase change material, the plurality of inner panels comprising a bottom inner panel, a top inner panel, and side inner panels;
wherein a first non-linear path is formed between the interior volume of the liner and the interior volume of the outer container where one or more of the outer panels meet at least one other of the outer panels;
wherein a second non-linear path is formed between the interior volume of the outer container and the interior volume of the inner container where one or more of the inner panels meet at least one other of the inner panels; and
wherein the method further comprises providing the bottom outer panel with at least one recess for receiving a portion of one or more of the side outer panels, the at least one recess and the portion of one or more of the side outer panels defining at least a portion of the first non-linear path.

* * * * *